United States Patent [19]
Chen et al.

[11] Patent Number: 6,078,309
[45] Date of Patent: Jun. 20, 2000

[54] SYSTEM AND METHOD FOR VISUALLY MEASURING COLOR CHARACTERISTICS OF A DISPLAY

[75] Inventors: Jia-Lin Chen; Li-Yuan Chang, both of Hsinchu, Taiwan

[73] Assignee: Way Tech Development, Inc., Hsinchu, Taiwan

[21] Appl. No.: 09/083,026

[22] Filed: May 22, 1998

[51] Int. Cl.$^7$ ................................................ G09G 5/10
[52] U.S. Cl. ........................ 345/147; 345/150; 348/184
[58] Field of Search ................. 345/12, 20, 22, 345/24, 147, 132, 150, 153, 154, 334, 347, 431, 432, 904; 348/178, 179, 656, 184; 395/131

[56] References Cited

U.S. PATENT DOCUMENTS

| | | | |
|---|---|---|---|
| 5,103,407 | 4/1992 | Gabor | 395/131 |
| 5,483,259 | 1/1996 | Sachs | 345/153 |
| 5,499,040 | 3/1996 | McLaughlin et al. | 345/146 |
| 5,589,853 | 12/1996 | Fujiki | 345/150 |
| 5,617,116 | 4/1997 | Edgar | 345/150 |
| 5,619,230 | 4/1997 | Edgar | 345/150 |
| 5,638,117 | 6/1997 | Engeldrum et al. | 348/179 |
| 5,726,672 | 3/1998 | Hernandez et al. | 345/22 |
| 5,754,222 | 5/1998 | Daly et al. | 348/184 |
| 5,791,781 | 8/1998 | Park et al. | 374/159 |
| 5,870,069 | 2/1999 | Choh et al. | 345/22 |
| 5,896,168 | 4/1999 | Hedwall | 348/179 |
| 5,898,436 | 4/1999 | Stewart et al. | 345/354 |
| 5,907,315 | 5/1999 | Vlahos et al. | 345/114 |
| 5,926,617 | 7/1999 | Ohara et al. | 395/109 |
| 5,933,130 | 8/1999 | Wagner | 345/147 |

*Primary Examiner*—Vijay Shankar
*Assistant Examiner*—Jeff Piziali
*Attorney, Agent, or Firm*—Rosenberg, Klein & Lee

[57] ABSTRACT

A system and method is provided for adjusting the performance of a display by adjusting a gray ramp to look like a neutral gray ramp, finding the white points of the display, and obtaining nonlinearity reference values for different colors each through adjusting the brightness of two pictures until the pictures disappear in background. The system and method according to the present invention requires no extra instruments or devices, and provides instructions on the display for easy operation with mouse or any input devices, thereby can be used by users without specialized knowledge to provide performance best fit users' requirements and application environment.

17 Claims, 3 Drawing Sheets

SYSTEM AND METHOD FOR VISUALLY MEASURING COLOR CHARACTERISTICS OF A DISPLAY

FIELD OF THE INVENTION

The present invention generally relates to a computer display made on the basis of CRT, particularly to a method and system for measuring the color characteristics of a video display monitor.

BACKGROUND OF THE INVENTION

Video display monitors are important accessories in a computer system, and only those displays with accurate color characteristics can provide accurate video information. Because of the difference in physical and electrical characteristics among vdms of even the same type, each vdm needs color test and adjustment under the environment of specific light.

The color characteristics of a vdm are the chromaticity of white points and the nonlinearity between the input voltage of a CRT and the output brightness thereof, both can be separately measured.

The RGB values of a color shown on a vdm is determined by the XYZ values of that color through the transformation $A_C$ as described in (1):

$$\begin{bmatrix} R \\ G \\ B \end{bmatrix} = \begin{bmatrix} a_{11} & a_{12} & a_{13} \\ a_{21} & a_{22} & a_{23} \\ a_{31} & a_{32} & a_{33} \end{bmatrix}^{-1} \begin{bmatrix} X \\ Y \\ Z \end{bmatrix} \quad (1)$$

$$= A_C^{-1} \begin{bmatrix} X \\ Y \\ Z \end{bmatrix}$$

where RGB are the values of red, green, and blue colors, representing the colors shown on the vdm, and XYZ are tristimulus values of a color, determined by the chromaticity of a color and its associated white value. Matrix $A_C$ is determined by the chromaticity of both phosphors and white point C. Usually the chromaticity of phosphors is fixed when manufacturing a vdm, therefore it is the white point that determines the RGB of a color displayed thereon. The value of a white point can be adjusted by circuit hardware or controlled by software.

The chromaticity of a white point means the chromaticity of a color viewed to be white. Usually the white point of a display is the chromaticity with which RGB are adjusted to be of equal value. A white point is a visual white color, or called "neutral gray", and means that no any visual color component at all; however, a white point on a vdm will be affected by environmental lights, therefore it is unnecessarily a white color or neutral gray even the RGB of the vdm is set to be of the same value.

Conventional schemes for measuring the chromaticity of a white point on a vdm is by using optical meters such as calorimeter, photometer, or spectroradiometer to measure the output of a display. Although the measurement by optical meters is accurate, it must rely on not only expensive and adjusted instruments, but also specialized knowledge and an environment suitable for performing necessary measurements, thereby it is usually beyond a user's capability to do necessary adjustments or measurements by himself.

Engeldrum et al suggest, in U.S. Pat. No. 5,638,117, another scheme in which a display is used to show a sequence of pictures for users to do adjustments based on matching card. Although the scheme saves the need of measurement by optical instruments, it requires matching card, thereby it is accompanied with higher cost and the inconvenience arising from a loss of the matching card, hence it is to be improved.

On the other hand, the nonlinearity characteristic of a display, which represents the relation between input voltages and displayed brightness, and which can be described as a power function (brightness=[voltage+$\alpha$]$^\gamma$), usually requires measuring the voltage and brightness of single points by optical instruments. The relation is determined by parameters $\alpha$ (called "black level error") and $\gamma$ (characterizing nonlinearity).

There are two representation modes for nonlinearity characteristic of a display: parameter mode and listing mode. As described above, the parameter mode is based on the values of $\alpha$ and $\gamma$. The listing mode is based on the value of voltage and brightness of multiple points. Both the modes require measuring voltage and brightness of single point by optical instruments, thereby are accompanied with the same drawbacks arising from the usage of optical instruments as described above.

One more point to be considered is that the application of optical instruments is based on hardware-based approach while color sensing by human being is based on the intuition of mankind. It shall be clear the measurement based on human being intuition instead of instrument is better than any way else because the judgment or evaluation on colors eventually relies on the sense of human being.

SUMMARY OF THE INVENTION

An object of the present invention is to provide a system and method for visually measuring white points on a display.

Another object of the present invention is to provide a system and method for visually measuring the nonlinearity characteristics of a display.

The another object of the present invention is to provide a system and method for measuring color characteristics of a display, without need of optical instruments or reference matching device.

A further object of the present invention is to provide a system and method for adjusting color characteristics of a display under users' environment.

Another further object of the present invention is to provide a system and method for measuring color characteristics of a display by a mouse.

According to the present invention, an embodied system for visually measuring the color characteristics of a display may be configured to comprise: an image for adjusting the color so that it looks as if it is a neutral gray ramp, in order to obtain (or to find) white points on the display; a first and a second pictures (images) for brightness adjustment in which the brightness is adjusted until both pictures disappear in background, in order to obtain the nonlinearity reference values for a first color of the display; a third and a forth pictures (images) for brightness adjustment in which the brightness is adjusted until both pictures disappear in background, in order to obtain the nonlinearity reference values for a second color of the display; and a fifth and a sixth pictures (images) for brightness adjustment in which the brightness is adjusted until both pictures disappear in background, in order to obtain the nonlinearity reference values for a third color of the display.

An embodied method according to the present invention for measuring the color characteristics of a display is to use a computer to provide users with a gray ramp for adjusting its color to reach a neutral gray ramp, in order to obtain (find) white points; and to configure two pictures (images) for obtaining nonlinearity reference values for each of different colors. The computer itself can adjust the display performance based on these obtained values.

The present invention may best be understood through the following description with reference to the accompanying drawings, in which:

Figure 1:
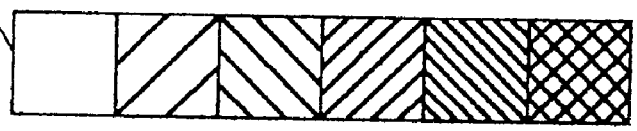
FIG. 1 is a diagram showing a neutral gray ramp.

REFERENCE NUMERALS 10 display screen
12 gray ramp
14 background
16 command
18 push button
20 background
22 picture (image)

DETAILED DESCRIPTION OF THE PREFERRED EMBODIMENTS

The present invention enables users to visually measure, under an environment filled with light, the color characteristics of a display so that a computer may adjust the display according to the measured values. The measurement can be done under any application environment, i.e., under the environment where the display is to be used, therefore the adjusted display can fully match the conditions of the environment wherein users operate the display. The adjustment can be made at any time to adapt to the variation of application environment.

A computer is all that to be used for the measurement, and users just operate according to the images shown on the display, without need of any instruments or devices. When proceeding the measurement, operating instructions are shown on the display by the computer, so that users use mouse, keyboard, or any other input devices to operate. Finally the computer can adjust the display according to the measured values.

Adjusting Settings for Brightness and Contrast

The adjustment of setting for brightness and contrast is done using the display's own screen. At first the contrast setting is adjusted to meet the user's favorite, then the brightness setting is adjusted to a MAX value (full scale) and the vertical or horizontal size is adjusted until vertical or horizontal scaling edges (margins) appear. Next step is to lower the brightness setting until the margins (scaling edges) disappear, and users can adjust the vertical and horizontal sizes and positions according to their favorites. The setting for brightness is no longer changed from now on.

Finding White Points

Let $R=(X_R,Y_R,Z_R)$ to represent the tristimulus values of a referenced white point. Here R is selected to represent the tristimulus values of a white color to be shown, such as a white point of an image. To find a white point is to find C* for the displayed RGB values of R, i.e., W (providing visual white color), as may defined by the relation between R and W shown below $$A^{-1}{}_C * R = W \quad (2)$$

Displaying, on the screen of a display, an image of a gray ramp, which is a rectangular comprising 6 blocks seated side by side, as shown in FIG. 1 where 6 blocks of gray color of different brightness under the referenced white point R are shown.

Figure 2:
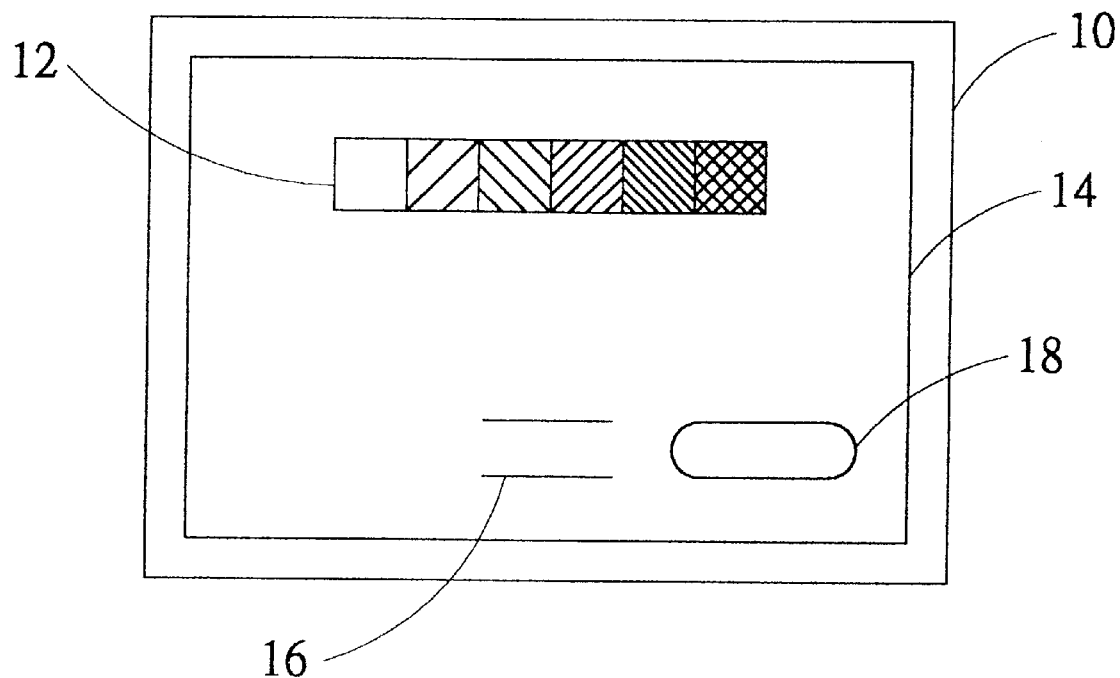
FIG. 2 shows finding white points.

According to equation (1), for a display with fixed chromaticity of phosphers, the RGB is changed when adjusting the value of C*. As shown in FIG. 2, the present invention provides display screen 10 with a gray ramp 12 for users to adjust C* until gray ramp 12 looks neutral. A neutral gray ramp is a gray ramp of gray color to viewers (observers). On display screen 12, background 14 comprises not only gray ramp 12 but also command 16 and push button 18 for instructing and enabling users to do adjustments. The white points can be found (obtained) according to equation (2) after neutral gray ramp is achieved by users.

Measurement of Two Sets of Reference Values

The present invention is based on a dithering process in which some images of known brightness are generated, and from among these images select the one with brightness closest to an image with voltage known while with brightness unknown, so that one set of values for voltage and brightness can be obtained. The dithering process may be further understood by referring to "Digital image processing" written by R. C. Gonzalez and R. E. Woods, and published in 1992 by Addison-Wesley.

The brightness and voltage are usually scaled between 0 and 1. With voltage at MAX scale, brightness is also at MAX scale. Brightness can be free from nonlinearity effect only when voltage is 0 (MIN) or 1 (MAX). In other words, a display at status of two levels 0 and 1 is not subject to nonlinearity effect, thereby its brightness can be correct. Selecting two different voltages to individually measure corresponding brightness will lead to obtaining two sets of reference values for voltage and brightness, whereby $\alpha$ and $\gamma$ can be computed by numerical method according to the two sets of reference values, thereby nonlinearity characteristics can be known. A better selection is that the two voltages respectively approximates 0 and 1.

Figure 3:
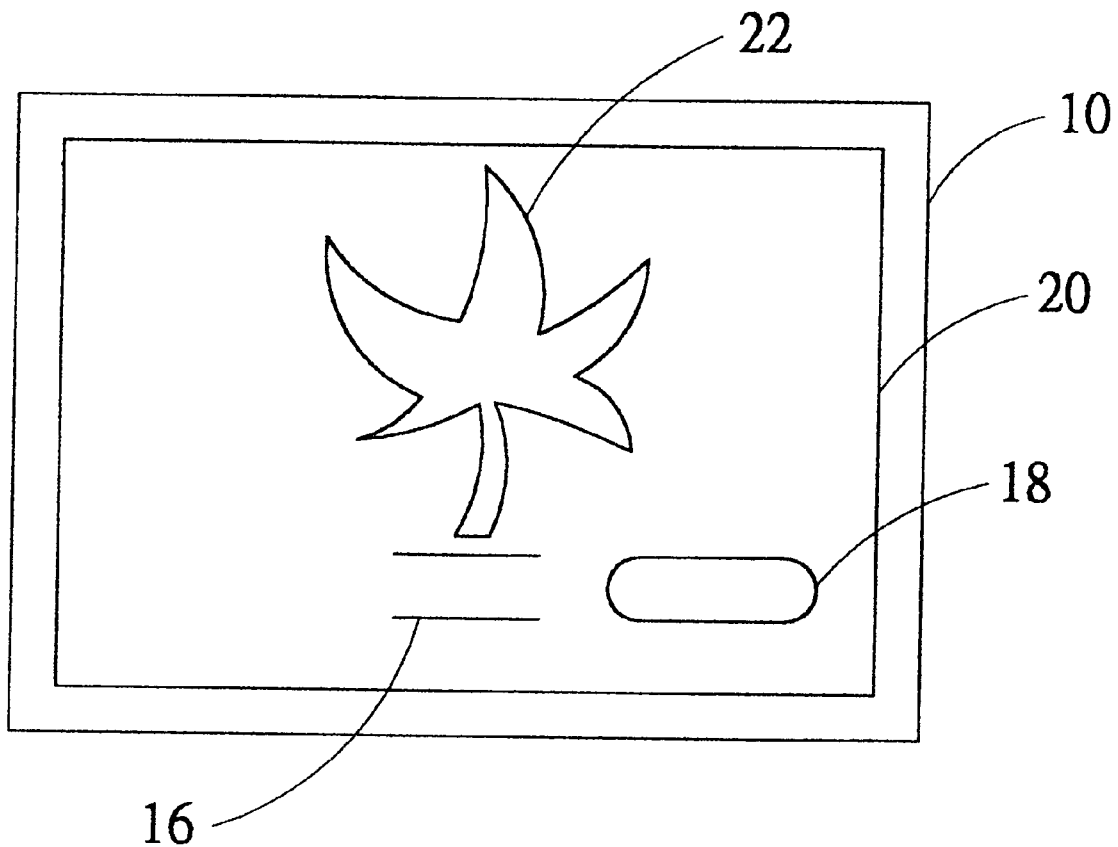
FIG. 3 shows measuring nonlinearity reference values for a display.

A scheme based on the present invention for measuring reference values is shown in FIG. 3 in which display screen 10 provides background 20 and picture (image) 22 for users to adjust the brightness of picture 22 until picture 22 disappears in background 20, thereby one set of reference values is obtained. Similarly a different picture may be provided for the same operating process to obtain another set of reference values.

Repeating the above operating process for each of three colors: red, green, and blue to obtain two sets of reference values respectively for the three colors, the nonlinearity characteristics of the display for the three colors can be obtained according to these reference values. During the operating process, command 16 and push button 18 are provided on display screen 10 for users to operate conveniently. A better embodiment is to use mouse for input operation; however, another input devices such as keyboard may also fit.

Based on image matching method employing dithered images, the embodiment according to the present invention requires no extra instruments, needs only simple and efficient steps, and provides full operating instructions, thereby extremely fit most of the users.

The above operating process can be described by the following steps:

step 1: adjusting brightness and contrast setting by using the display's own screen;

step 2: adjusting the color of an image until it looks like a neutral gray ramp;

step 3: adjusting the first picture until it disappears in background;

step 4: adjusting the second picture until it disappears in background;

step 5: adjusting the third picture until it disappears in background;

step 6: adjusting the fourth picture until it disappears in background;

step 7: adjusting the fifth picture until it disappears in background;

step 8: adjusting the sixth picture until it disappears in background. Among the above steps, step 2 is for finding white points, steps 3 and 4 for providing nonlinearity reference values for red color, steps 5 and 6 for providing nonlinearity reference values for green color, steps 7 and 8 for providing nonlinearity reference values for blue color. Based on these measured values, self-adjustment functions to adapt the color characteristics of the display to users' application environment for achieving optimum performance.

Those who skilled in the art shall understand that the above process is just one of preferred embodiments, and the sequence order of steps is not absolutely relevant. For example, the step of finding white points (step 2) may be implemented after measuring nonlinearity reference values (step 3 to step 8).

The system and method based on the present invention enable the users who lack specialized knowledge to easily adjust the color characteristics of a display, and enable the adjusted display to provide performance best fit users and application environment.

While the invention has been described in terms of what are presently considered to be the most practical and preferred embodiments, it shall be understood that the invention is not limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color characteristics measuring method for visually measuring the color characteristics of a display under an environment filled with light, comprising the steps of providing an image and adjusting the color of said image to look like a neutral gray ramp, in order to obtain the white points of said display;

providing a first and a second pictures and adjusting the brightness of said first and said second pictures until said first and said second pictures disappear in background, in order to obtain the nonlinearity reference values of a first color of said display;

providing a third and a fourth pictures and adjusting the brightness of said third and said fourth pictures until said third and said fourth pictures disappear in background, in order to obtain the nonlinearity reference values of a second color of said display; and providing a fifth and a sixth pictures and adjusting the brightness of said fifth and said sixth pictures until said fifth and said sixth pictures disappear in background, in order to obtain the nonlinearity reference values of a third color of said display.

2. The color characteristics measuring method according to claim 1 further comprising, before obtaining the white points of said display, a step of using the screen of said display to adjust brightness and contrast setting.

3. The color characteristics measuring method according to claim 2 wherein said step of using the screen of said display to adjust brightness and contrast settings comprises the steps of adjusting contrast setting to meet users' favorite;

raising brightness setting to maximum value and adjusting the horizontal or vertical size for horizontal or vertical margins to appear;

lowering brightness setting until said margins disappear; and adjusting horizontal and vertical sizes and positions according to users' favorite.

4. The color characteristics measuring method according to claim 1 wherein said first, said second, and said third colors are red, green, and blue colors.

5. The color characteristics measuring method according to claim 1 further comprising steps of displaying command and push button for users to do adjustment.

6. The color characteristics measuring method according to claim 5 wherein users use a mouse to do adjustment.

7. A color characteristics measuring method for visually adjusting the color characteristics of a display under an environment filled with light, comprising the steps of providing an image and adjusting the color of said image to look like a neutral gray ramp, in order to obtain the white points of said display;

providing a first and a second pictures and adjusting the brightness of said first and said second pictures until said first and said second pictures disappear in background, in order to obtain the nonlinearity reference values of a first color of said display;

providing a third and a fourth pictures and adjusting the brightness of said third and said fourth pictures until said third and said fourth pictures disappear in background, in order to obtain the nonlinearity reference values of a second color of said display;

providing a fifth and a sixth pictures and adjusting the brightness of said fifth and said sixth pictures until said fifth and said sixth pictures disappear in background, in order to obtain the nonlinearity reference values of a third color of said display; and adjusting said display according to the obtained white points, and the nonlinearity reference values of said first, said second, and said third colors.

8. The color characteristics measuring method according to claim 7 further comprising, before all of said steps, a step of using the screen of said display to adjust brightness and contrast settings.

9. The color characteristics measuring method according to claim 8 wherein said step of using the screen of said display to adjust brightness and contrast settings comprises the steps of adjusting contrast setting to meet users' favorite, raising brightness setting to maximum value and adjusting the horizontal or vertical size for horizontal or vertical margins to appear;

lowering brightness setting until said margins disappear; and adjusting horizontal and vertical sizes and positions according to users' favorite.

10. The color characteristics measuring method according to claim 7 wherein said first, said second, and said third colors are red, green, and blue colors.

11. The color characteristics measuring method according to claim 7 further comprising steps of displaying command and push button for users to do adjustment.

12. The color characteristics measuring method according to claim 11 wherein users use a mouse to do adjustment.

13. A color characteristics measuring system for visually adjusting the color characteristics of a display under an environment filled with light, comprising:

an image with color to be adjusted to look like a neutral gray ramp for obtaining the white points of said display;

a first and a second pictures with brightness to be adjusted until said first and said second pictures disappear in background, in order to obtain the nonlinearity reference values of a first color of said display;

a third and a fourth pictures with brightness to be adjusted until said third and said fourth pictures disappear in background, in order to obtain the nonlinearity reference values of a second color of said display;

a fifth and a sixth pictures with brightness to be adjusted until said fifth and said sixth pictures disappear in background, in order to obtain the nonlinearity reference values of a third color of said display.

14. The color characteristics measuring system according to claim 13 wherein said image and said pictures are provided by said display.

15. The color characteristics measuring system according to claim 13 further comprising command and push button on the screen of said display for instructing users to do adjustment.

16. A color nonlinearity characteristics measuring method for visually measuring the color nonlinearity characteristics of a display under an environment filled with light, comprising the steps of provIDing a first and a second pictures and adjusting the brightness of said first and said second pictures until said first and said second pictures disappear in background, in order to obtain the nonlinearity reference values of a first color of said display;

providing a third and a fourth pictures and adjusting the brightness of said third and said fourth pictures until said third and said fourth pictures disappear in background, in order to obtain the nonlinearity reference values of a second color of said display;

providing a fifth and a sixth pictures and adjusting the brightness of said fifth and said sixth pictures until said fifth and said sixth pictures disappear in background, in order to obtain the nonlinearity reference values of a third color of said display.

17. The color nonlinearity characteristics measuring method according to claim 16 wherein said first, said second, and said third colors are red, green, and blue colors.

* * * * *